United States Patent
Danilovic et al.

(10) Patent No.: US 9,421,521 B2
(45) Date of Patent: Aug. 23, 2016

(54) NANOSEGREGATED BIMETALLIC OXIDE ANODE CATALYST FOR PROTON EXCHANGE MEMBRANE ELECTROLYZER

(71) Applicant: UCHICAGO ARGONNE, LLC, Chicago, IL (US)

(72) Inventors: Nemanja Danilovic, Willowbrook, IL (US); Yijin Kang, Naperville, IL (US); Nenad Markovic, Hinsdale, IL (US); Vojislav Stamenkovic, Naperville, IL (US); Deborah J. Myers, Lisle, IL (US); Ram Subbaraman, Sunnyvale, CA (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 34 days.

(21) Appl. No.: 14/502,825

(22) Filed: Sep. 30, 2014

(65) Prior Publication Data
US 2016/0089658 A1 Mar. 31, 2016

(51) Int. Cl.
| | |
|---|---|
| *B01J 23/00* | (2006.01) |
| *B01J 23/46* | (2006.01) |
| *B01J 37/16* | (2006.01) |
| *B01J 37/12* | (2006.01) |
| *B01J 37/08* | (2006.01) |
| *B01J 37/18* | (2006.01) |
| *B01J 37/14* | (2006.01) |
| *B01J 37/03* | (2006.01) |
| *B01J 35/02* | (2006.01) |
| *C25B 9/08* | (2006.01) |
| *C25B 13/04* | (2006.01) |

(52) U.S. Cl.
CPC .............. *B01J 23/468* (2013.01); *B01J 35/023* (2013.01); *B01J 37/031* (2013.01); *B01J 37/08* (2013.01); *B01J 37/12* (2013.01); *B01J 37/14* (2013.01); *B01J 37/16* (2013.01); *B01J 37/18* (2013.01); *C25B 9/08* (2013.01); *C25B 13/04* (2013.01)

(58) Field of Classification Search
CPC ....................................................... B01J 23/00
USPC ....................................................... 502/325
See application file for complete search history.

(56) References Cited

U.S. PATENT DOCUMENTS

| | | |
|---|---|---|
| 8,183,174 B2 | 5/2012 | Valdez et al. |
| 8,361,288 B2 | 1/2013 | Reece et al. |
| 8,603,400 B2 | 12/2013 | Hays et al. |

OTHER PUBLICATIONS

Markovic & Ross, "Surface science studies of model fuel cell electrocatalysts," Surface science Reports, vol. 45, 2002, pp. 117-229.

Matsumoto & Sato, "Electrocatalytic properties of transition metal oxides for oxygen evolution reaction," Materials Chemistry and Physics, vol. 14, 1986, pp. 397-426.

Mattos-Costa et al., "Characterisation of surfaces modified by sol-gel deroved $Ru_xIr_{1-x}O_2$ coatings for oxygen evolution in acid medium," Electrochimica Acta, vol. 44, 1998, pp. 1515-1523.

Neyerlin et al., "Combinatorial study of high-surface-area binary and ternary electrocatalystys for the oxygen evolution reaction," Journal of The Electrochemical Society, vol. 156, 2009, pp. B363-B369.

Riga et al, "Electronic Structure of Rutile Oxides $TiO_2$, $RuO_2$, and $IrO_2$ Studied by X-ray Photoelectron Spectroscopy," Physica Scripta, vol. 16, 1977, p. 351.

Rossmeisl et al., "Electrolysis of water on (oxidized) metal surfaces," Chemical Physics, vol. 319, 2005, pp. 178-184.

Ruban et al., "Surface segregation energies in transition-metal alloys," Physical Review b, vol. 59, 1999, p. 15990.

Sasaki et al., "Core-Protected Platinum Monolayer Shell High-Stability Electrocatalysts for Fuel-Cell Cathodes," Angewandte Chemie International Edition, vol. 49, 2010, pp. 8602-8607.

Snyder et al., "Structure/processing/properties relationships in nanoporous nanoparticles as applied to catalysis of the cathodic oxygen reduction reaction," Journal of the American Chemical Society, vol. 134, 2012, pp. 8633-8645.

Stamenkovic et al., "Improved oxygen reduction activity on $Pt_3Ni$ (111) via increased surface site availability," Science, vol. 315, 2007, pp. 493-497.

Stamenkovic et al., "Trends in electocatalysis on extended and nanoscale Pt-bimetallic alloy surfaces," Nature Materials, vol. 6, 2007, pp. 241-247.

Strasser et al., "Lattice-strain control of the activity in dealloyed core-shell fuel cell catalysts," Nature Chemistry, vol. 2, 2010, pp. 454-460.

Subbaraman et al., "Enhancing Hydrogen Evolution Activity in Water Splitting by Tailoring $Li^+$-$Ni(OH)_2$-Pt Interfaces," Science, vol. 334, 2011, pp. 1256-1260.

Trasatti, "Electrocatalysis in the anodic evolution of oxygen and chlorine," Electrochemica Acta, vol. 29, 1984, pp. 1503-1512.

Trasatti, "Electrocatalysis: understanding the success of DSA®," Electrochemica Acta, vol. 45, 2010, pp. 2377-2385.

Wang et al., "Multimetallic $Au/FePt_3$ Nanoparticles as Highly Durable Electrocatalyst," Nano Letters, vol. 11, 2011, pp. 919-926.

Danilovic et al., "Using Surface Segregation to Design Stable Ru-Ir Oxides for the oxygen Evolution Reaction in Acidic Environments," Argonne National Laboratory, n.d., 24 pages.

(Continued)

*Primary Examiner* — Edward Johnson
(74) *Attorney, Agent, or Firm* — Foley & Lardner LLP

(57) ABSTRACT

A surface segregated bimetallic composition of the formula $Ru_{1-x}Ir_x$ wherein $0.1 \leq x \leq 0.75$, wherein a surface of the material has an Ir concentration that is greater than an Ir concentration of the material as a whole is provided. The surface segregated material may be produced by a method including heating a bimetallic composition of the formula $Ru_{1-x}Ir_x$, wherein $0.1 \leq x \leq 0.75$, at a first temperature in a reducing environment, and heating the composition at a second temperature in an oxidizing environment. The surface segregated material may be utilized in electrochemical devices.

20 Claims, 11 Drawing Sheets

(56) References Cited

OTHER PUBLICATIONS

Galizzioli et al., "Ruthenium dioxide: a new electrode material. I. Behaviour in acid solutions of inert electrolytes," Journal of Applied Electrochemistry, vol. 4, 1974, pp. 57-67.

Greeley & Markovic, "The road from animal electricity to green energy: combining experiment and theory in electrocatalysis," Energy and Environmental Science, vol. 5, 2012, pp. 9246-9256.

Hepel, "Lateral exchange interactions in sub-monolayer films of co-adsorbed species," Journal of Electroanalytical Chemistry and Interfacial Electrochemistry, vol. 175, 1984, pp. 15-31.

Huppauff & Lengeler, "Valency and structure of iridium in anodic iridium oxide films," Journal of the Electrochemical Society, vol. 140, 1993, 598-602.

Kotz & Neff, "Anodic iridium oxide films: An UPS study of emersed electrodes," Surface Science, vol. 160, 1985, pp. 517-530.

Kotz & Stucki, "Stabilization of $RuO_2$ by $IrO_2$ for anodic oxygen evolution in acid media," Electrochemica Acta, vol. 31, 1986, pp. 1311-1316.

Kotz et al., "Oxygen Evolution of Ruthenium and Iridium Electrodes. XPS-Studies," Journal of Electroanalytical Chemistry and Interfacial Electrochemistry, vol. 150, 1982, pp. 209-216.

Markovic & Ross, "A study of bismuth ruthenate as an electrocatalyst for bifunctional air electrodes," Journal of the Electrochemical Society, vol. 141, 1994, pp. 2590-2597.

NANOSEGREGATED BIMETALLIC OXIDE ANODE CATALYST FOR PROTON EXCHANGE MEMBRANE ELECTROLYZER

STATEMENT REGARDING FEDERALLY SPONSORED RESEARCH

This invention was made with government support under Contract No. DE-AC02-06CH11357 awarded by the U.S. Department of Energy, Office of Science, Office of Basic Energy. The United States government has certain rights in this invention.

BACKGROUND

The growth of hydrogen-based renewable energy sources as viable alternatives to fossil fuel-based technologies is critically dependent on the development of materials that can significantly influence the efficacy of oxygen electrochemistry; both the oxygen reduction reaction (ORR: $O_2+4H^++4e^- \leftrightarrow 2H_2O$) in fuel cells and the oxygen evolution reaction (OER: $2H_2O \leftrightarrow O_2+4H^++4e^-$) in electrolyzers. The development of such materials is guided by two equally important fundamental principles: (i) the catalytic activity for the desired reaction and (ii) long-term stability in hostile electrochemical environments. The methods used to enhance the catalytic activity of the materials for the ORR are diverse, ranging from the alloying and de-alloying of metal catalysts to the synthesis of core-shell catalysts.

The selection of materials for the OER (the anodic half-cell reaction in electrolyzers) is significantly limited, since the metal oxides must have high electronic conductivity, activity, and stability—all very demanding requirements that have severely hampered the utilization of oxide materials in this role. Traditionally, activity of the OER has, for the most part, been correlated primarily in terms of energetic factors whereby the binding energy between the "active sites" and the oxygenated species is assumed to control the kinetics of the OER. Such considerations have formed the backbone of the well-known volcano plot that is generally used to express the kinetics of the OER as a function of more fundamental properties of the oxide materials (e.g. oxygen binding energy, enthalpy of oxide formation, etc. . . . ) which are known as descriptors. It is generally accepted that it is possible to identify materials with unique electronic properties that bind one intermediate not too weakly and another intermediate not too strongly. So far, such energetics-based mechanisms have been used to explain why the most active anode material for the OER in polymer electrolyte membrane electrolyzer (PEM) environments at low pH is the highly conductive $RuO_2$.

Although previous studies have offered important insights into possible relationships between activity of the OER and the oxygen binding energy, no attempts have been made toward an even more important aspect of the electrocatalysts: the fundamental link between activity and stability under an electrolyzer's operating conditions. Without this knowledge, it is very difficult (if not impossible) to build the guiding principles required for the development of new synthesis methods that allow for the design of stable and active real-world commercial anode catalysts. The stability of oxide catalysts has previously been "tested" simply by monitoring the OER current at a certain electrode potential; if the current is found not to change with time (usually within a couple of minutes) the conclusion reached is that the catalyst (typically high surface area materials) is stable. However, this conclusion does not consider that the amount of tested material was always high enough to sustain the apparent kinetics of the OER. The fact that the lifetime of pre-existing oxide materials in electrolyzers is very limited is a clear indication that degradation of oxide and dissolution of active component take place simultaneously with the OER. This is also the case for a RuIr alloy that is currently considered to be one of the most stable anode materials for the OER in PEM based electrolyzers. Several possible explanations have been proposed for a perceived stabilization of Ru atoms by the presence of nearby Ir atoms, including charge transfer coupled with band mixing of the metals' d-bands, modification of the surface dipoles, and the enhanced oxidation of Ir and subsequent passivation of the catalyst surface. However, the materials used to deduce the fundamental principles for the OER catalysts often lead to ambiguities. Commonly used materials include: high surface area particles and oxide macroscopic films, which are often poorly characterized and exhibit uncontrolled defect densities along with poorly defined atomic-level structure.

SUMMARY

A method of forming a surface segregated Ru—Ir oxide is provided. The method includes heating a bimetallic composition of the formula $Ru_{1-x}Ir_x$, wherein $0.1 \leq x \leq 0.75$, at a first temperature in a reducing environment, and then heating the composition at a second temperature in an oxidizing environment. The resulting material exhibits a surface with an Ir concentration that is greater than an Ir concentration of the material as a whole.

A surface segregated Ru—Ir oxide material is provided. The material includes a bimetallic composition of the formula $Ru_{1-x}Ir_x$, wherein $0.1 \leq x \leq 0.75$. A surface of the material has an Ir concentration that is greater than an Ir concentration of the material as a whole.

An electrochemical apparatus is provided. The apparatus includes a bimetallic catalyst composition of the formula $Ru_{1-x}Ir_x$, wherein $0.1 \leq x \leq 0.75$. A surface of the material has an Ir concentration that is greater than an Ir concentration of the material as a whole.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and embodiments of, inventive nanosegregated bimetallic oxide materials. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

A surface-science approach was employed to develop active and stable Ru—Ir nanoparticles for the OER in acidic media by successfully transferring the knowledge gained from well-characterized, extended bulk alloys to thin metal films and finally to commercial catalysts, including microparticles and nanoparticles. By applying surface-sensitive probes in combination with spectroscopy and analytical tools the unique and symbiotic relationship between activity and stability of Ru and Ir surface atoms before, during, and after the OER was established at the atomic level. Studying the functional links between activity and stability of monometallic oxides (Au, Pt, Ir, Ru and Os), indicated that the most active oxides (Au<<Pt<Ir<Ru<<Os) are, in fact, the least stable (Au>>Pt>Ir>Ru>>Os) materials at high overpotentials. That the lower defect density Ru(0001) and Ir(111) single crystals are more stable but less active than the Ru-polycrystalline and Ir-polycrystalline electrodes indicates that the relationship between stability and activity is also influenced by the density of surface defects. Based on these result, a new synthesis method was developed for optimizing the stability and activity of Ru—Ir OER catalysts. The method includes tuning the near-surface composition of Ru and Ir elements via surface segregation, resulting in the formation of nano-segregated domains that enhance the stability and activity of the surface atoms. A bulk $Ru_{0.5}Ir_{0.5}$ alloy with segregation-induced enrichment of Ir on the surface and near-surface regions exhibited ~4-times higher stability than preexisting Ru—Ir OER catalysts, while preserving substantially the same activity as the preexisting catalysts.

Activity and Stability Trends of Monometallic Oxides

Figures 1A, 1B, 1C:
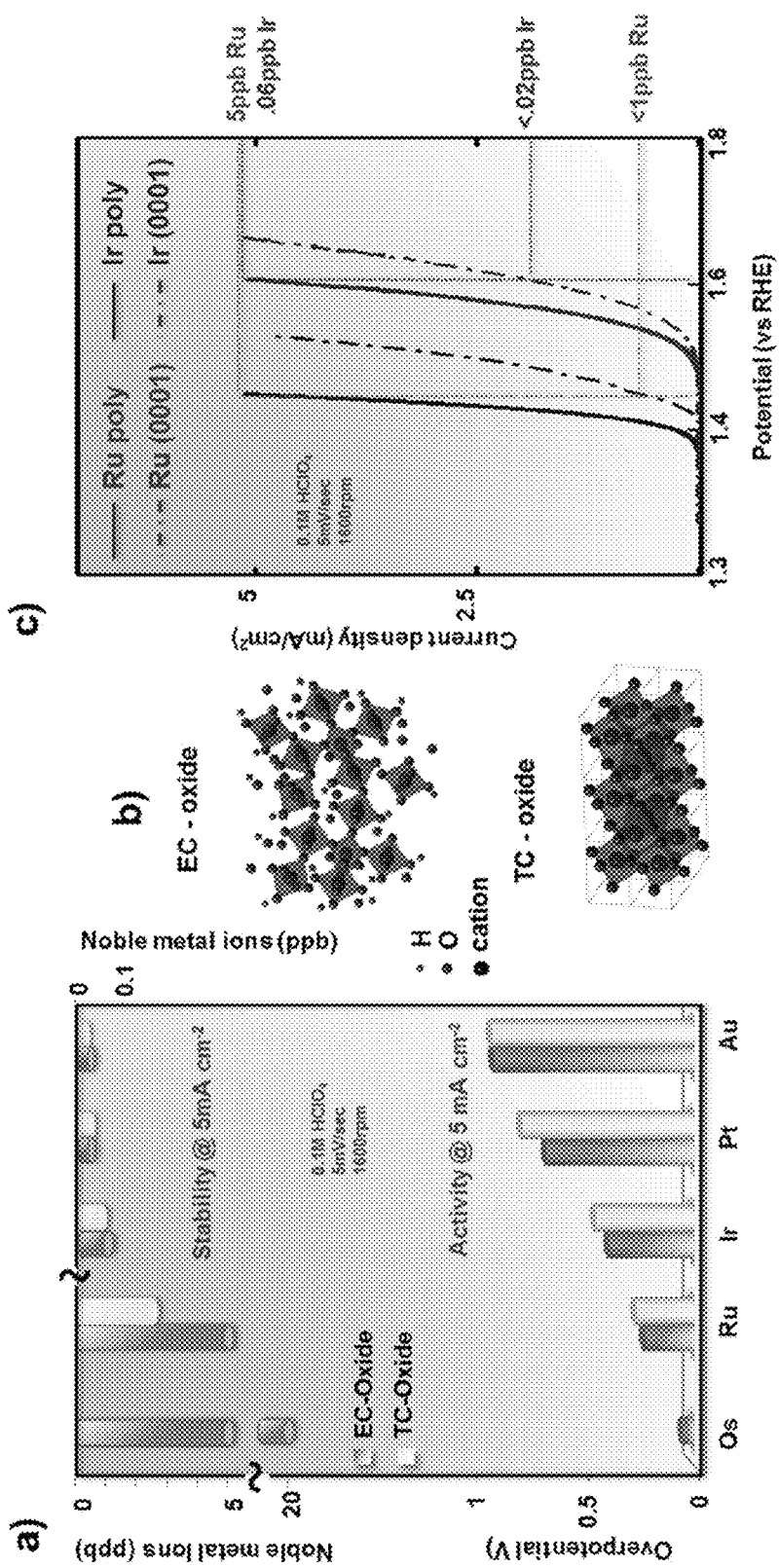
FIGS. 1(a)-(c) depict inverse trends in activity and stability of oxide materials prepare by TC- and EC-methods, a schematic representation of the crystalline rutile TC-oxide and amorphous EC-oxide structures, and current potential curves recorded during the first positive sweep for the OER on single crustal and polycrystalline electrodes, respectively.

The activity for the OER (expressed as measured overpotentials at a constant current density) in acidic environments on five monometallic oxides, ranging from noble Au, Pt and Ir to less-noble Ru and Os was investigated. Together with the data for the stability of these oxides during the OER, expressed as the quantifiable dissolution of metal cations during the very first sweep from 0.05 to 1.45V, the findings allowed the exploration of the periodic trends in activity and stability of the monometallic oxides. Two types of oxides with strikingly different morphologies were studied: crystalline "thermal chemical" oxides (TC-oxide) grown by thermal $O_2$ exposure of the metal samples, and highly defective amorphous electrochemical oxides (EC-oxide) involving hydroxyl and related species in "hydrous oxides" formed by water electrooxidation at high anodic potentials. Schematics representing TC-oxides and EC-oxides are depicted in FIG. 1(b). The results indicate how the relationships between the nature (noble vs. non-noble), morphology (crystalline vs. hydrous/amorphous), and structure (single crystal vs. polycrystalline) of oxides affect the stability and reactivity of these surfaces.

In FIG. 1(a), three features are noteworthy. First, the degree of activity increases with the order of oxophilicity of the respective element (Au<<Pt<Ir<Ru<<Os), and is inversely proportional to the stability (nobility) of the oxide (Os<<Ru<Ir<Pt<<Au). The trends are a strong indication that there is a fundamental link between the stability of oxide materials and their reactivity for the OER; an issue which has previously been overlooked for reactions such as an electrochemical transformation of water to di-oxygen and protons. The "most active" material is not Ru oxide, but rather Os oxide; the former occupying the top of the preestablished volcano curves for the OER. Even though Os is the most active, as demonstrated by Os having the lowest overpotential in FIG. 1(a), is is also highly unstable, as shown in the upper part of FIG. 1(a), with the Faradic efficiency for the OER on Os oxide found to be only 5%, as reported in Table 1. The bottom part of FIG. 1(a) also shows that for the investigated elements, the overpotential for the OER is higher for the crystalline TC-oxides than for the hydrous EC-oxides, and that all TC-oxides are more stable. Given the higher density of defects in the EC-oxides relative to the TC-oxides, this result suggests that the density of defects on the surface may influence the relationships between activity and stability.

TABLE 1

|    | Overpotential (V) | | Dissolution (ppb) | |
| --- | --- | --- | --- | --- |
|    | EC-Oxide | TC-Oxide | EC-Oxide | TC-Oxide |
| Os | 0.05  |       | 20   |      |
| Ru | 0.22  | 0.26  | 4.84 | 2.18 |
| Ir | 0.38  | 0.44  | 0.06 | 0.03 |
| Pt | 0.66  | 0.77  | 0.02 | 0.02 |
| Au | 0.895 | 0.905 | 0.02 | 0.02 |

Potential-Dependent Nature of Ru and Ir Oxides

It is useful to compare the electrode potential-dependent variations in the electronic properties (oxidation states) of EC-oxide layers that form on Ru and Ir metal surfaces during the positive potential scan from 0.05 V to 1.45 V. Using the in-situ X-ray near edge structure analysis (XANES), variations of the valence state, n, of Ru and Ir are estimated as a function of the electrode potential. Well-characterized thin films were employed for this purpose, as the presence of large contributions from the bulk atoms can occlude the changes occurring in the oxidation states of the materials. XANES offers the ideal method to probe these materials because the electrocatalytic activity/stability are influenced by the near surface region atoms. Thin (~1-5 nm) films of Ru and Ir were prepared on glassy carbon substrates, ensuring that the XANES analysis of changes in oxidation state of the near-surface oxide before and during the OER is not influenced by the contribution from bulk metallic atoms' valence states.

Figures 2A, 2B:
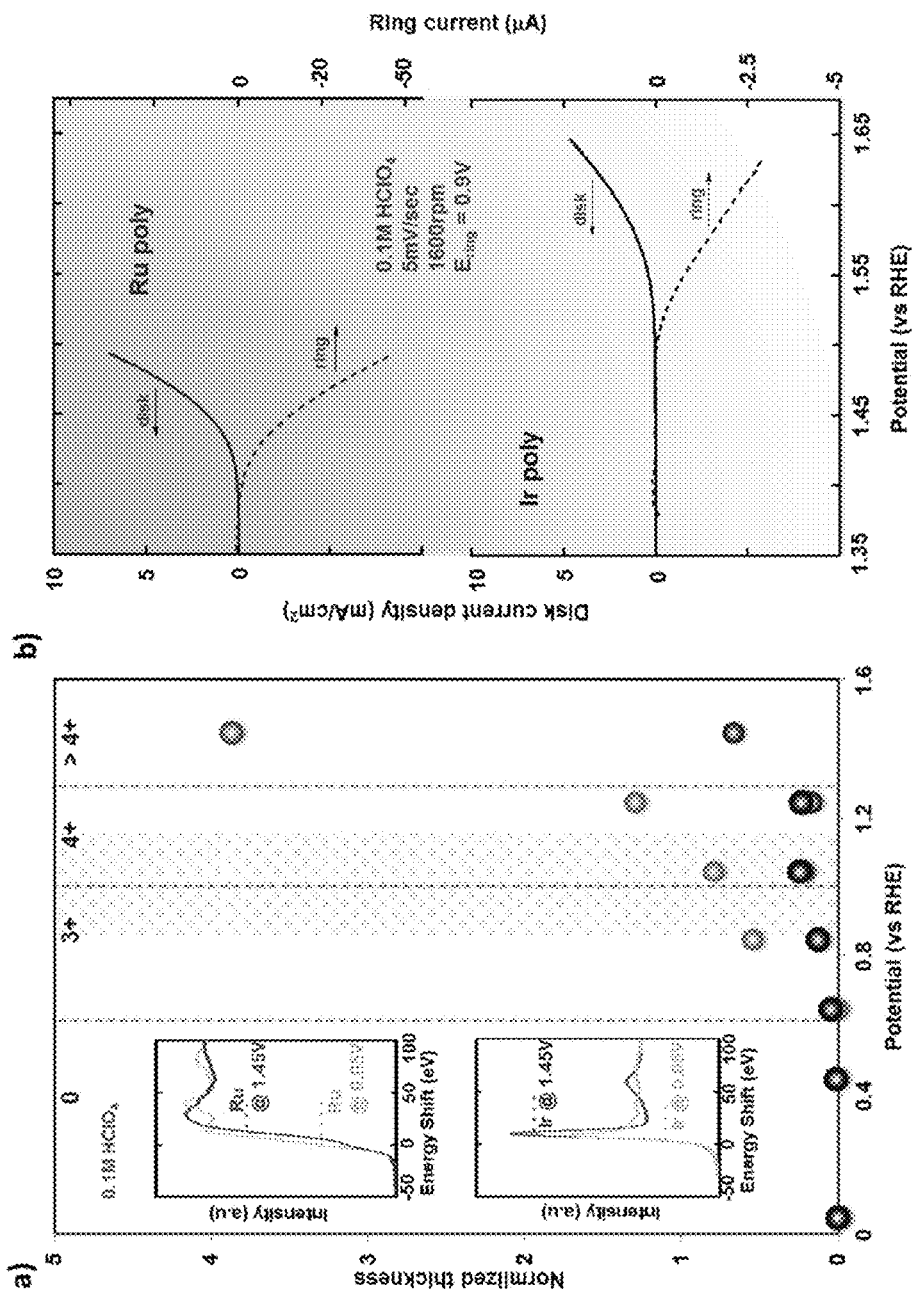
FIGS. 2(a) and 2(b) depict XANES spectra for Ru and Ir oxide-free surfaces at 0.05 V and oxide covered surfaces at 1.45 V (inserts) and potential variations in the oxidation state of Ru (light circles) and Ir (dark circles), and RRDE measurements for simultaneously recording the OER on the central Ru or Ir disk electrode and the dissolution of Ru and Ir on the ring electrode, respectively.

The insets of FIG. 2(a) show typical XANES spectra for Ru and Ir recorded at 0.05V and 1.45 V. At low potentials both Ir and Ru exist in their native metallic state, as confirmed by reference spectra for the pure metals, whereas at 1.45 V both elements are found to exhibit characteristic changes corresponding to formation of the oxide species. An increase in the white line intensity of the Ir L-edge at 1.45 V suggests the formation of higher oxidation state iridium, with the characteristic Ir—O bond distance of 1.97 Å. Similarly, the XANES spectrum for Ru at 1.45 V is suggests that Ru is also in a higher oxidation state, as determined from a shift of the position of the Ru K-edge that is consistent with previously reported results for Ru oxide.

Although it is not possible to unambiguously determine the exact value of the surface oxidation state of Ru and/or Ir during the OER, it is possible to determine the average oxidation state in the near-surface region, which is n>4+. Considering that, for a given electrode potential, the valence state of Ru and Ir may not differ significantly, the only way to ascertain how the formation of the near-surface oxide may depend on the nature of a metal electrode is to also consider the kinetics of oxide formation, i.e. at the same electrode potential, the rate at which oxide formation takes place at a given oxidation state for each metal species. In order to capture this behavior, the notation of "effective oxide thickness" is employed. As presented in FIG. 2(a), the metric of "effective oxide thickness" provides information on how the rate of oxide formation (and the resulting oxide thickness) for a certain valence state of Ru and Ir depends on the electrode potential. As shown in FIG. 2(a), between 0.05 and 0.8 V Ru and Ir are found to be in the zero valence state (n=0), indicating that reversible adsorption of hydroxyl species at this potential has no significant effect on the oxidation state of Ru and Ir. Above 0.8 V, however, the valence state systematically changes from n=0 to n=3+ between 0.8<E<1.0 V, to mixtures of n=3+ and n=4+ between 1.0<E<1.3 V, to n=4+ between 1.3<E<1.45 V, and to n>4+ for E>1.45 V. Although potential-dependent transitions in oxidation state are element-insensitive, the Ru oxide layer is always much thicker than the corresponding Ir oxide layer at the same oxidation state and the same electrode potential. For example, Ru oxide with $Ru^{n>4+}$ is four times thicker than Ir oxide with $Ir^{n>4+}$, both of which are formed above E=1.45 V. In addition to yielding significant insights for establishing the potential-dependent variations in oxidation state, these results highlight the previously unexplored contributions of the kinetics of oxide formation to the relationships between the nature of oxide materials, as well as their stability and reactivity before and during the OER.

The activity and stability of single crystal surfaces, which have a well-controlled arrangement of surface atoms, may be compared with polycrystalline electrodes, which contain a variety of ill-defined low and high coordination surface atoms. This strategy has previously established structure-function relationships of electrode materials for which the structure of surface atoms during the reaction (i.e. the density of surface defects) is not affected by the applied electrode potential or by strong adsorption of reaction intermediates. However, this is not the case for the OER which, as shown in FIG. 1, is accompanied by the concomitant dissolution of surface atoms. In order to avoid the confounding effects of continuous surface dissolution/evolution during subsequent cycling of the electrode and to establish clear structure-function relationships for both stability and activity, the activity was recorded during the first potential scan only. The results for Ru(0001), Ir(111), Ru-poly, and Ir-poly electrodes are summarized in FIG. 1(c), and show current-potential curves (polarization curves) for the OER, as well as solution concentrations of dissolved Ru and Ir that are produced in the first potential sweep. At the same overpotentials, activity of the OER on Ru(0001) and Ir(111) is significantly reduced relative to the Ru-poly and Ir-poly electrodes, indicating that the lower defect density single crystals are less active than the polycrystalline electrodes. The stability of the oxide surfaces, measured as the amount of dissolved cations in the electrolyte, is inversely proportional to the activity. This inverse relationship between activity and stability indicates that the stability of surface atoms is also controlled by the coordination of surface atoms. Taken together, the results shown in FIG. 1 show that the nature of the oxide (Ru vs. Ir) and the density of surface defects (single crystals vs. poly-electrodes) play a synergistic role in controlling the stability and reactivity of surface atoms.

Relationships Between the Valence State Stability and Reactivity

The relationships between the valence state of cations, stability, and reactivity are explored by monitoring the electrode potential-dependent Ru and Ir dissolution behavior before and during the OER by combining the XAS spectroscopy with the rotating ring disk electrode (RRDE) method. In the RRDE experiment, employed in a "collection mode", the ring electrode is held at a constant potential at which Ru and Ir cations dissolved from disk electrodes in the solution phase deposit onto the ring electrode, while simultaneously recording the OER on the central Ru or Ir disk electrode. FIG. 2(b) shows that as the disk potential is scanned positively from 1.35 V, the onset of Ru and Ir dissolution is accompanied by the onset of the OER. Further analyses of the RRDE results indicate that the contribution of the current corresponding to Ru and Ir dissolution relative to the total anodic current measured on the disk electrodes is only 10% for Ru and 1% for Ir, indicating that the Faradic efficiency of the OER decreases from Ir (99%) to Ru (90%). Comparing FIGS. 2(a) and 2(b) demonstrates that the dissolution of Ru and Ir coincides with a transition from n=4+ to n>4+, indicating that the dissolution is triggered by the appearance of higher oxidation states. These results demonstrate that reactivity is linked to the stability of these oxide materials.

FIGS. 1 and 2 show that during the OER the surface is constantly evolving, and thus it is impossible to determine the true value of the turnover frequency (TOF) for the OER, which quantifies the number of electrons produced/consumed per active site per second. The experimental analyses indicate that: (i) the surface of the catalyst is constantly evolving during the OER with Ru and Ir atoms transitioning from a stable valence state n=4+ to the active but unstable valence state n>4+; and (ii) the morphology of the catalyst influences the onset of this transition. Thus, these two properties control the density of defect sites, which is higher for Ru than Ir at the same electrode potential. The defect sites serve as the "active sites" for the OER. Consequently, the experimental analyses indicate that it is difficult to predict or correlate reactivity as a function of the oxygen binding energy for ideal catalyst surfaces.

Synthesis of Nano-Segregated $Ru_{1-x}Ir_x$ Bulk and Thin Oxide Alloy Surfaces

Figures 3A, 3B, 3C:
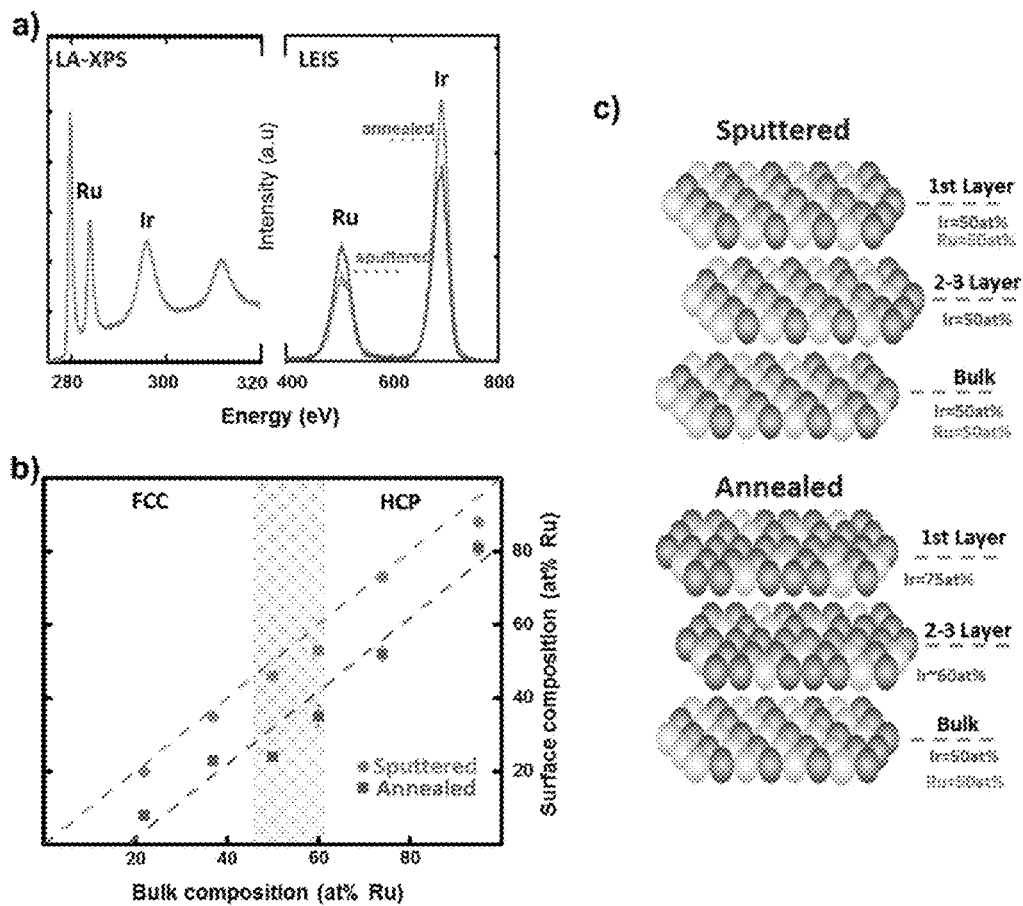
FIGS. 3(a)-(c) depict representative XPS and LIES spectra used to quantify the bulk and surface composition of UHV sputtered and annealed $Ru_{1-x}Ir_x$ electrodes, Ru surface and bulk compositions of sputtered and annealed $Ru_{1-x}Ir_x$ alloys as determined by XPS (circles) and LEIS (squares), and schematic representations of the $Ru_{0.5}Ir_{0.5}$ sputtered (top) and annealed (bottom) surface with a segregation-induced enrichment (~75 at %) of Ir at the surface.

Alloying Ru with Ir is the most promising method for "stabilizing" Ru. However, preexisting Ru—Ir anode materials suffer from low stability of the catalysts, and thus the lifetime of the Ru—Ir oxide catalysts in PEM electrolyzers is very limited. To overcome the stability issues associated with preexisting Ru—Ir anodes, a surface science-based approach was pursued. This strategy makes use of the surface segregation phenomenon (e.g., the enrichment of one element at the surface relative to the bulk) that is observed for many bimetallic alloys. To the inventors' knowledge, this phenomenon has never been explored in studies of Ru—Ir alloys, including those in UHV and electrochemical environments. By examining five $Ru_{1-x}Ir_x$ extended alloys with different bulk atomic ratios of Ru and Ir, as shown in FIG. 3(b), trends in the surface segregation profile for the first three to four atomic layers in each alloy may be established. Then, after ex situ UHV and in situ spectroscopic and electrochemical characterization, the optimal nano-segregated profile that results in the optimal stability and activity for the OER was determined.

A variety of UHV analytical tools were employed to establish the differences between the surface and the bulk composition of five $Ru_{1-x}Ir_x$ extended alloys. These materials exhibit a surface composition nearly identical to the bulk composition after sputtering, while after vacuum annealing, the materials exhibit a segregation-controlled surface composition. A 50-50 at % Ru—Ir alloy ($Ru_{0.5}Ir_{0.5}$) resulted in the most effective segregation profile of the alloys produced. The surface composition of oxygen-free, as-sputtered and thermally-annealed $Ru_{0.5}Ir_{0.5}$ specimens was determined from low energy ion scattering (LEIS), while X-ray photoelectron spectroscopy (XPS) was employed to define the bulk composition of the alloys. As summarized in FIG. 3(a), the surface and bulk composition of the as-sputtered alloys was essentially identical, as was expected since Ru and Ir have similar sputter cross-sections. FIG. 3(a) also reveals that annealing of the as-sputtered surfaces induces surface enrichment of Ir atoms, a phenomenon that can be accounted for by the lower heat of sublimation of Ir. FIG. 3(b) shows that the alloy with an hcp bulk lattice (>50 at % Ru) exhibits a more pronounced segregation than the fcc alloys (<50 at % Ru). However, even for the hcp alloy the outermost layer is not completely enriched by Ir. As shown in FIG. 3(b), the surface composition of $Ru_{0.5}Ir_{0.5}$ is approximately 75 at % Ir. Schematics of the nano-segregated surface profile are shown in FIG. 3(c).

Figures 4A, 4B, 4C:
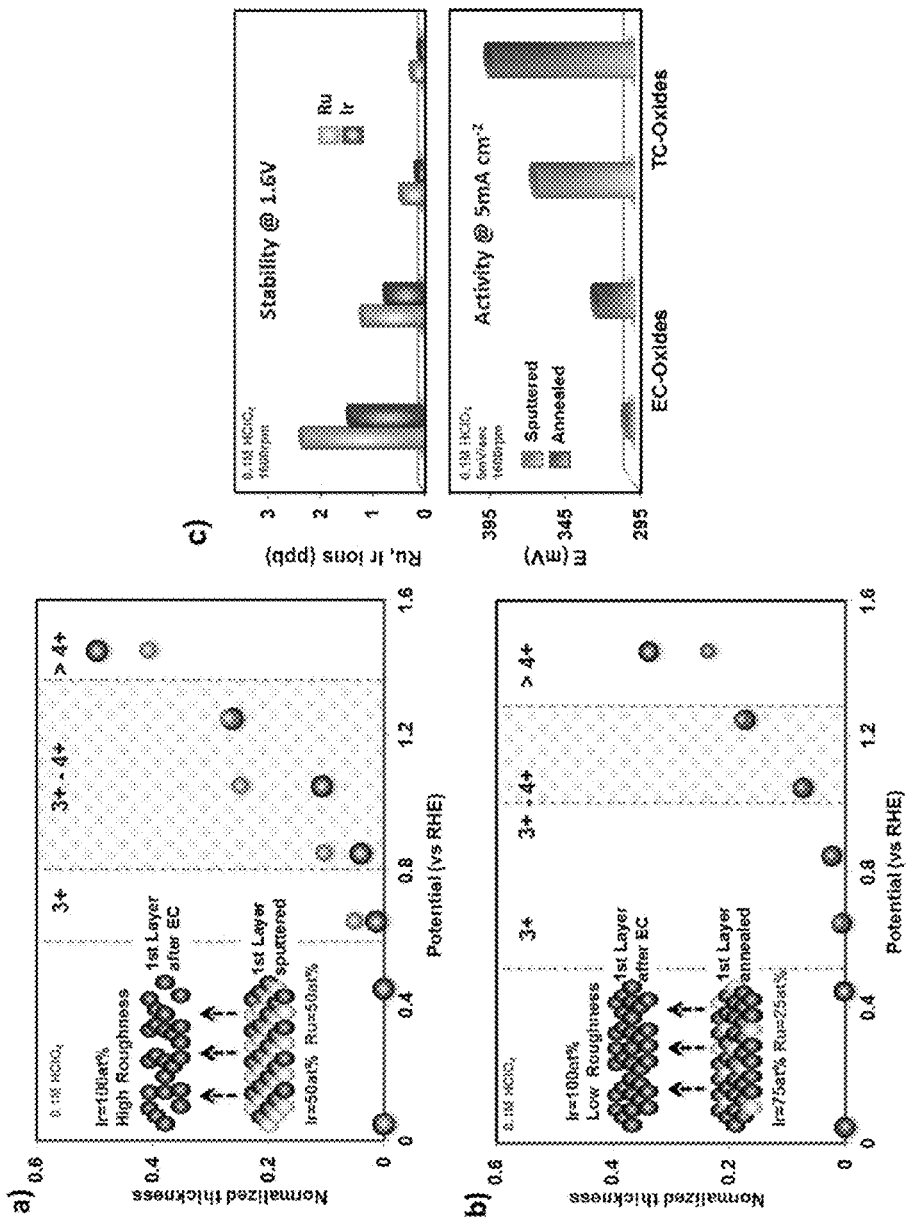
FIGS. 4(a)-(c) depict the potential-dependent changes in valence states of sputtered $Ru_{0.5}Ir_{0.5}$, determined from XANES analyses, the potential-dependent changes in valence states of annealed $Ru_{0.5}Ir_{0.5}$ determined from XANES analyses, and relationships between activity and stability for annealed and sputtered $Ru_{0.5}Ir_{0.5}$ alloys prepared either as EC-oxides or TC-oxides.

In order to investigate the relationships between the near-surface composition of an alloy and the potential-dependent variation in the oxidation states, as well as the stability and reactivity of alloy oxides, both TC and EC oxide samples were prepared as before, using both as-sputtered and thermally-annealed $Ru_{0.5}Ir_{0.5}$ alloys in order to yield four different oxides with different surface functionalities and properties. Using the same "normalized effective thickness" analysis with XANES as presented earlier, the nature and stability of the oxides generated on $Ru_{0.5}Ir_{0.5}$ alloys as a function of the electrode potential-dependent variations in the oxidation state of the near-surface Ru—Ir oxide layer were investigated. FIG. 4 shows the potential-dependent normalized effective thickness obtained on as-sputtered, FIG. 4(a) and thermally-annealed, FIG. 4(b), thin films in acidic media. Qualitatively, the same "oxidation shift" is observed for the as-sputtered, FIG. 4(a), and thermally-annealed, FIG. 4(b), Ru—Ir thin films as for pure Ru and Ir, FIG. 2(a). The transition from 0<n<4+ to n>4+ occurs at the same potentials. In turn, this implies that the potential-dependent variations in oxidation states are rather similar between monometallic and bimetallic electrodes. This result is surprising in view of the common assumption that the electronic properties of Ru are significantly altered by the addition of Ir. Thus, there is no significant modification to the electronic structure of Ru upon the addition of Ir.

Quantitative analysis of FIG. 4 provides two further observations of note. First, the extent of oxidation, expressed as a combination of the normalized effective thickness and the corresponding oxidation state, is much lower for the thermally-annealed films than for the as-sputtered films, indicating the higher stability of the thermally-annealed surface, as shown in FIG. 4(b). This difference can be accounted for by the temperature-induced increase in the near-surface concentration of Ir, as well as by the ordering of surface atoms—a well-established UHV protocol for removal of the surface defects present in an as-sputtered thin film. Second, independent of the nature of electrode preparation (as-sputtered vs. annealed), XANES analysis reveals that there is a much higher normalized effective thickness of Ir oxide with the n>4+ state than Ru oxide. This result is surprising given that FIG. 2(a) shows that the kinetics of oxide formation are much faster on the pure Ru electrode than on the Ir electrode. One mechanism that may reconcile these observations, and in line with the results in FIG. 2(a), is that Ru is less stable than Ir at the same overpotential, and therefore dissolves quickly, leaving behind a more "noble" Ir skeleton layer and resulting in the formation of a higher normalized effective thickness of Ir oxide, as depicted in the schematic model of FIG. 4(c). The Ir skeleton layer protects the buried, less-noble Ru atoms, leading to the formation of a lower normalized effective thickness of Ru oxide than would be expected from the kinetics of oxide formation on the pure metal electrodes. Comparing the rate of dissolution of Ru as a function of time, in terms of number of OER cycles, shows that for a pseudo-stable morphology and composition of $Ru_{0.5}Ir_{0.5}$, the Ru dissolution rate reaches a minimum and corresponds to a concentration of ~100 at % Ir at the surface.

This "stabilization model" allows the rationalization of the time-dependent decrease in activity on an annealed and thermally oxidized $Ru_{0.5}Ir_{0.5}$ alloy relative to the $RuO_2$ electrodes. The fast dissolution of the less-stable Ru from the first layer of the alloy transforms the Ru-like activities to Ir-like activity on the remaining Ir-skeleton. By comparison, continuous dissolution of Ru from $RuO_2$ constantly supplies the surface with "active" defect sites. As a result, the observed steady-state activity on $Ru_{0.5}Ir_{0.5}$ is an average activity that is positioned between the activities of $RuO_2$ and $IrO_2$. As in the case of monometallic oxides, stability may influence the oxide activity.

FIG. 4(d) shows that crystalline TC-oxides and thermally-annealed electrodes, which contain a low density of defects, are less active than the corresponding amorphous EC-oxides and as-sputtered electrodes, which contain a much higher concentration of defects. This result indicates that the density of surface defects plays a role in the activity of the oxides. The formation of lower defect-density TC-oxides from Ru—Ir alloy electrodes results in less active but more stable surfaces than the higher defect-density EC-oxides, regardless of the initial surface preparation, such as as-sputtered or thermally-annealed. Additionally, the solution concentration of Ru is always much higher than that of Ir, indicating preferential dissolution of Ru from all of the produced alloy concentrations. This produces a rapid loss of the surface and near-surface Ru atoms and the formation of the "Ir protective skeleton," with ~100 at % of Ir in the topmost layer. Although the Ir skeleton is formed for both as-sputtered and thermally-annealed surfaces, the microscopic structures of these two surfaces are rather different. The thermally-annealed surfaces are more ordered, having fewer defects and being less porous, as schematically shown in FIG. 4(b). The results indicate that nano-segregated domains provide an optimal balance between stability and activity. The nano-segregated materials exhibit an activity four times higher than preexisting materials and a relatively low overpotential for the OER.

Synthesis of Nano-Segregated $Ru_{0.5}Ir_{0.5}$ Nanoparticles

Figure 5:
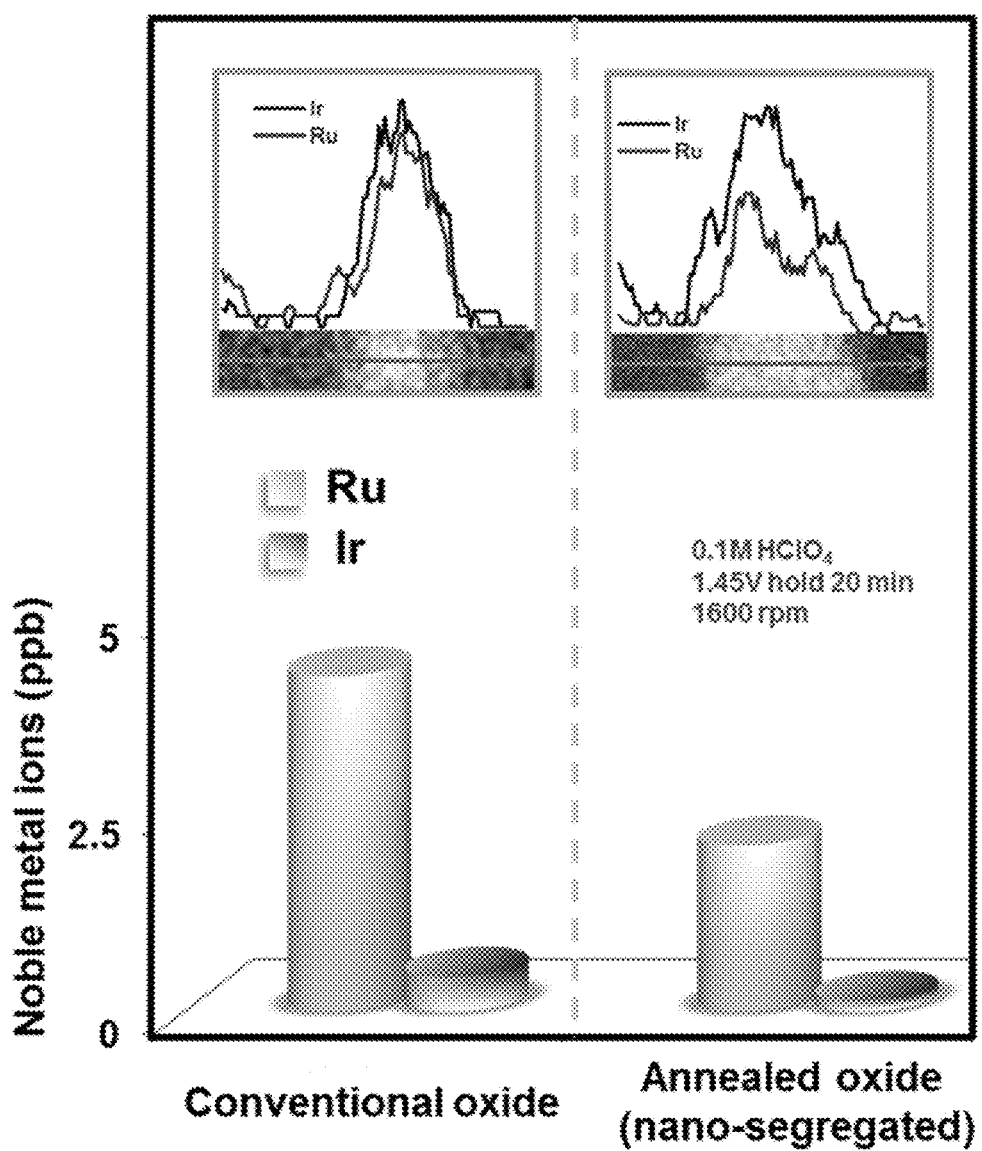
FIG. 5 depicts in the upper portion energy dispersive X-ray spectroscopy (EDX) used to determine the elemental distribution of Ru and Ir within a nanoparticle, and depicts in the bottom portion measured Ru and Ir cations in a solution produced during the OER (E=1.45V; i=5 mA/cm²; duration time 20 minutes).

The results indicate that controlling segregation-induced enrichment and ordering of Ir in the Ru—Ir alloy is a useful strategy for optimizing the activity and stability of these bimetallic alloys. As a result, the viability of this strategy was tested by synthetizing nanoparticles that mimic the nano-segregated structures presented in the previous section. The synthesis of real-world anode catalysts includes at least two steps: segregation-induced formation of the Ir skeleton, and then thermal chemical oxidation of such structures. A colloidal synthesis method was employed to create homogeneous, bulk-like $Ru_{0.5}Ir_{0.5}$ alloy nanoparticles. The as-synthesized nanoparticles were subsequently annealed in a reducing atmosphere in order to induce surface enrichment and ordering of Ir and enable investigations of the effects of surface ordering on stability and activity of these nanoparticles. Both the homogeneous and nano-segregated nanoparticles were then subjected to thermal oxidation for comparison with commercial $Ru_{0.5}Ir_{0.5}O_2$ catalysts. Transmission electron microscopy (TEM) revealed that the well-dispersed $Ru_{0.5}Ir_{0.5}O_2$ catalysts have nearly identical cubo-octahedral shapes and a particle size distribution centered in the 5-10 nm range, and the distribution of Ru and Ir within the nanoparticles was determined using energy dispersive X-ray spectroscopy (EDX). As shown in the upper portion of FIG. 5, the annealed and thermally-oxidized nanoparticles exhibit a surface enrichment of Ir, similar to the bulk and thin film electrodes.

By contrast, the un-annealed and oxidized nanoparticles contain a homogeneous distribution of Ru and Ir. This demonstrates that the annealing step forms a surface-segregated alloy, and indicates that the annealed nanoparticles may be able to preserve the increased reactivity and stability properties observed in the nano-segregated thin film samples. Although the activities of nano-segregated and homogeneous nanoparticles are nearly identical, the stability of the surface-enriched alloy nanoparticles is nearly 3-4 times higher than the homogeneous nanoparticles, as shown in the lower portion of FIG. 5.

The electrochemical transformation of $H_2O$ to $O_2$ on oxide surfaces takes place at defect sites, which are created upon the dissolution of a cations with oxidation state n>4+. If the oxide is stable, then it is completely inactive for the OER. A practical consequence of such a close relationship between activity and stability is that the best materials for the OER should balance stability and activity in such a way that the dissolution rate is neither too fast nor too slow. For the Ru—Ir system, this requirement is realized by employing the power of surface segregation to form a nano-segregated "Ir protective skeleton" that is 4 times more stable, but equally active to, preexisting Ru—Ir alloy anode catalysts.

The surface segregated bimetallic composition may be described by the formula $Ru_{1-x}Ir_x$ wherein $0.1 \leq x \leq 0.75$. According to one embodiment, the material may have a composition in which $0.25 \leq x \leq 0.75$ or $0.4 \leq x \leq 0.6$, such as x=0.5. The material may be provided in the form of nanoparticles, bulk materials, or thin film materials. According to one embodiment, the material may be in the form of nanoparticles with a particle size distribution centered in the range of about 5 nm up to about 10 nm, such as nanoparticles with an average particle diameter of about 10 nm. The surface of the material may have an Ir concentration that is greater than an Ir concentration of the material as a whole. In other words, the surface of the material may be Ir-rich, in comparison to the interior of the material. According to one embodiment, the Ir concentration of the surface is at least about 10% greater than the Ir concentration of the material as a whole, such as an Ir concentration at least about 15%, about 25%, about 50%, about 75%, or more, of the Ir concentration of the material as a whole. The surface of the material may be substantially free of Ru, such as free of Ru.

The surface segregated bimetallic composition may be produced by a method including annealing and oxidizing steps. The method may include heating a bimetallic composition of the formula $Ru_{1-x}Ir_x$, wherein $0.1 \leq x \leq 0.75$, at a first temperature in a reducing environment, and then heating the composition at a second temperature in an oxidizing environment. The heating of the material in a reducing environment may be an annealing treatment that results in a material with a surface having an Ir concentration that is greater than an Ir concentration of the material as a whole. The reducing environment may include $H_2$, such as in an amount of at least about 3% up to about 5%, with the remainder of the reducing environment being an inert gas. According to one embodiment, the reducing environment may be a mixture of $H_2$ and Argon, such as Ar-3% $H_2$ or Ar-5% $H_2$. The first temperature may be at least about 300° C. up to about 500° C., such as 350° C. or 400° C. The bimetallic composition may be homogeneous prior to heating in the reducing environment.

The heating of the material in an oxidizing environment may oxidize the surface of the material. The oxidizing environment may be an oxygen containing environment, such as a pure $O_2$ environment. The second temperature may be any appropriate temperature that results in the oxidation of the material, such as temperature in the range of about 300° C. to about 500° C. According to one embodiment, the second temperature may be about 350° C.

The bimetallic composition subjected to the heating process may be bulk material, a thin film material, or a nanoparticle material. A bimetallic nanoparticle material may be formed by a solution-based, colloidal, process. The nanoparticle formation process may include forming a solution containing Ru and Ir, heating the solution to a first reaction temperature, adding a reducing agent to the solution, heating the solution to a second reaction temperature, and recovering nanoparticles of the bimetallic composition. The nanoparticles may be recovered from the solution by a process including cooling the solution and adding ethanol to the cooled solution to precipitate the nanoparticles.

The surface segregated bimetallic material may be employed in an electrochemical apparatus. According to one embodiment, the electrochemical apparatus may be an apparatus configured for alkaline water electrolysis, chlorine evolution, or $CO_2$ reduction. The electrochemical apparatus may include any appropriate electrolyte, such as an alkaline or an acidic electrolyte. The electrochemical apparatus may be a polymer electrolyte membrane electrolyzer. The surface segregated bimetallic material may exhibit an activity at least about 4 times greater than a homogeneous material with the same composition, while exhibiting at least about 90% of the homogeneous material's stability.

Experimental Methods

Figures 6A, 6B:
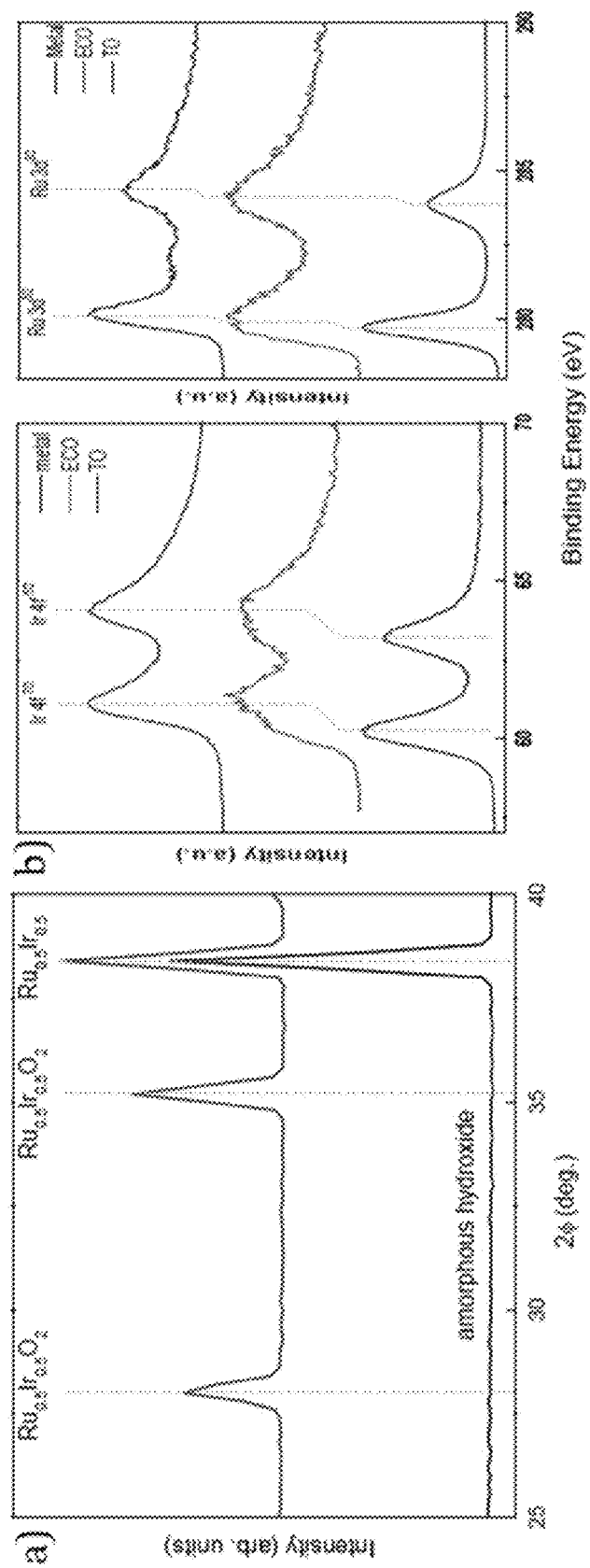
FIGS. 6(a) and 6(b) depict ex-situ bulk characterization of $Ru_{1-x}Ir_x$ metals, thermal (TC), and electrochemical (EC) oxides utilizing X-ray diffraction, and X-ray photoelectron spectroscopic ex-situ characterization of metal, electrochemical, and thermal oxides, respectively.

Bulk metal and alloy electrodes, obtained from ACI alloys (cylindrically shaped, 6 mm dia., 4 mm thick, 99.99% pure materials), were ground and polished down to 0.05 µm alumina powder (Buehler powders and grinding paper). This procedure was repeated when needed, such as after excessive dissolution or thermal oxidation. The bulk electrodes were subsequently annealed in UHV (as described below) or in a RF furnace in Ar-3% $H_2$ for 5 min at 1100° C. "Sputtered" bulk electrodes were prepared in the UHV (as described below). Thermal oxides were prepared by first annealing in Ar-3% $H_2$ as described above, then subsequently annealing in the RF furnace in pure $O_2$ at 600° C. (pure Ru), 700° C. (Ru—Ir alloys) and 800° C. (pure Ir) for 5 minutes. Ru(0001) and Ir(111) single crystal electrodes (cylindrically shaped, 6 mm dia., 4 mm thick) were obtained from Mateck, and were polished down to 0.05 µm alumina powder to obtain a mirror finish. The single crystal surfaces were prepared using a RF furnace in Ar-3% $H_2$ for 5 minutes at 1300° C. Electrochemical oxides were prepared by cycling in 0.1M $HClO_4$ between 0.05V-1.45V RHE at 50 mV/sec for 50 cycles. The samples were then transported immediately either to the UHV chamber for XPS or to the diffractometer for XRD measurement. X-ray diffraction (XRD) was employed to determine the crystallinity of the oxides, and the resulting XRD patterns are shown in FIG. 6(a). The TC oxides produced crystalline X-ray spectra, characteristic of a rutile structure, along with the substrate metal patterns because the X-rays penetrated through the thickness of the grown oxide into the metal bulk. The EC oxides did not produce an X-ray response, indicating that the structure of the as grown EC oxide is amorphous, as expected. XPS characterization was employed to confirm the presence of an oxide on the EC surfaces and to compare to the EC oxides to the TC oxides, as shown in FIG. 6(b).

Thin films were prepared by magnetron sputter deposition onto Ti disks (6 mm dia., 4 mm thick, ACI alloys, 99.99% pure) in a sputter deposition chamber (AJA International, Inc.) with a nominal base pressure of $4 \times 10^{-8}$ Pa equipped with both radio-frequency (RF) and direct current (DC) power supplies. The Ti disks were polished with 0.05 µm alumina powder (Buehler) on microcloth polishing pads (Buehler), rinsed and sonicated in Millipore water. Prior to the deposition of metal films, the substrates were cleaned with RF Ar plasma for 4 minutes (25 W RF, 0.2 Pa Ar). As-deposited films were removed from the sputter chamber protected by a drop of Millipore water and transferred to a tube furnace (Carbolite) where the films were annealed under a controlled atmosphere, or stored for XAS experiments. For XAS experiments, the samples were sputtered to the following thickness Ir—1 nm, $Ru_{0.5}Ir_{0.5}$—2 nm and Ru—5 nm, due to experimental constraints Annealed films were produced by annealing in a tube furnace for 1 hr at 350° C. in a Ar-3% $H_2$, these conditions were found to elicit the same surface enrichment without affecting the Ti substrate. The temperature for annealing was confirmed by performing LEIS to analyze the evolutions of surface composition with time.

Examination of the EC oxide and TC oxide spectra reveals a positive shift in binding energies for both Ru and Ir compared to the base metal spectra, indicating the presence of oxides on both the TC and EC oxide surfaces. The EC-oxide includes a split band indicating that the EC oxide formed isn't thick enough to eliminate the contribution from the metal bulk, while the TC oxide appears fully oxidized within the characteristic depth of the incoming X-ray.

Figure 7:
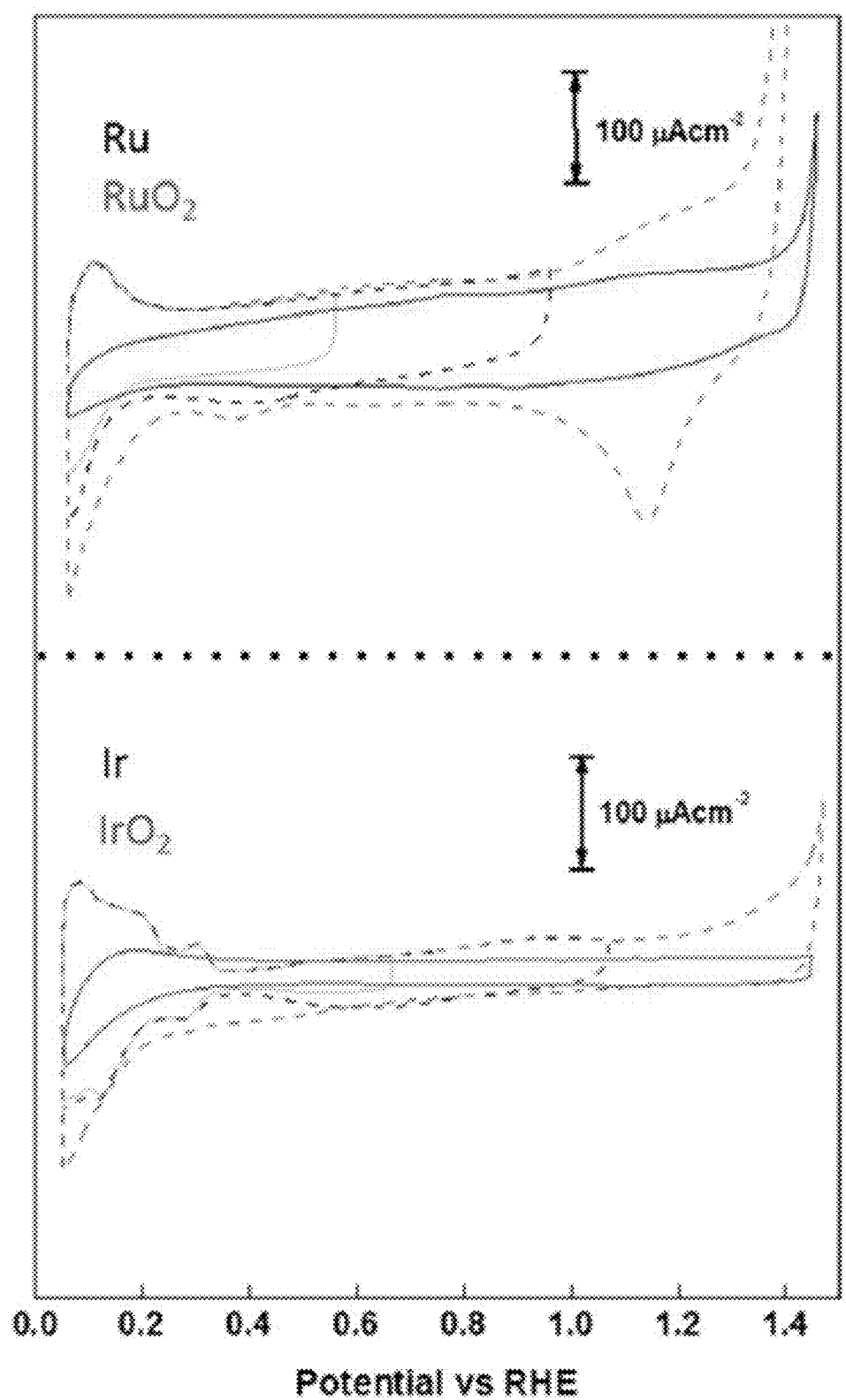
FIG. 7 depicts voltammetric responses of Ru and Ir measured by cyclic voltammograms of TC and EC oxides of Ru and Ir in 0.1 M $HClO_4$.

The differences in the voltammetric properties of the surface oxides formed via thermal-chemical (TC) and electrochemical (EC) routes are shown in FIG. 7. The upper portion of FIG. 7 shows cyclic voltammograms (CVs) obtained for Ru, and the lower portion shows CVs for Ir. The electrode potential range, from 0.05 to 1.5 V, spans the region between the onset of cathodic hydrogen evolution and the oxygen evolution reactions. As shown in FIG. 1(a), the Ru and Ir metal surfaces exhibit "quasireversible" adsorption of both hydrogen below 0.35 V and hydroxyl species between 0.35<E<1 V, and an irreversible oxide formation above 1 V. Once the EC-oxides were formed, deviations from voltammetric symmetry on the negative-going sweep were observed, especially for oxophilic Ru. The voltammetric response from TC-oxides is strikingly different, e.g., the adsorption of hydrogen and OHad formation peaks, as well as the fresh anodic oxide formation and the usual oxide reduction peak on the return scan, are either not clearly visible or entirely absent, respectively. Furthermore, subsequent voltammetric cycles and holds at low potentials (e.g., 0.05 V) for the TC-oxides yielded CVs which slowly exhibit the features observed for the EC-oxide systems. This result indicates that the oxides grown by thermal chemical methods undergo reduction at markedly higher cathodic potentials, ca. 0.5 V, than the oxide formed from water electrooxidation.

Nanoparticles were synthesized under an argon flow, and 0.1 mmol of $Ru(acac)_3$ and 0.1 mmol of $Ir(acac)_3$ were dissolved in 10 mL of oleylamine and 5 mL of benzyl ether to form a synthesis solution. The formed solution was heated to 180° C. Once the temperature of the solution in the reaction flask reached 180° C., 1 mL of 1M superhydride was injected into the reaction flask. The reaction temperature was increased to 240° C. and was maintained at 240° C. for 30 minutes. After the reaction, the solution was allowed to cool. The produced product was precipitated by ethanol, and then redispersed in hexane. The nanoparticles were then dispersed onto Ti or GC disks, heated in a tube furnace to 200° C. for 2 hrs to evaporate the surfactant, then oxidized in a pure $O_2$ atmosphere at 350° C. for 1 hr to obtain "as-sputtered" i.e., conventional bulk oxide. To obtain an annealed (surface segregated Ir) oxide the metal nanoparticles were heated to 400° C. in Ar-5% $H_2$ for 1 hr prior to the oxidation treatment discussed above. This temperature was optimal in producing the Ir segregation, as confirmed by microscopic characterization.

After electrode preparation, the surface was protected with a drop of deionized water (DIW), embedded into a rotating disk (RDE) or rotating ring disk electrode (RRDE) and transferred to a standard three-compartment electrochemical cell containing 0.1M $HClO_4$ (Sigma Aldrich). The electrodes were immersed under potential control, at 0.05 V (CV or XAS) or 1.23 V (OER measurements) in a solution saturated with Ar (identical OER results were obtained in $O_2$, without affecting activity or stability measurements). The sweep rate for CV's was 50 mV/sec. While for potentiodynamic (OER) measurements the sweep rate was 5 mV/sec at a rotation rate of 1600 rpm. Potentiodynamic and potentiostatic experiments were obtained with iR compensation. An Ag/AgCl reference electrode, and Pt counter electrode were used in all experiments; all reference potentials were corrected to the reversible hydrogen electrode (RHE) scale. No Pt was detected in the solution after OER experiments (ICP measurements), or on the surface of the electrodes (XPS), indicating that there was no dissolution of the counter electrode during experiments. Dissolution of the counter electrode would be detrimental to OER performance due to the much lower activity of Pt.

RRDE measurements were performed in the collection mode, wherein while recording the OER on the Ru disk electrode, the ring electrode was potentiostated at 0.9 V, a potential at which solution phase Ru4+, the dissolution product in acid solution, was deposited onto the ruthenized-Pt ring electrode at a diffusion control rate. The results are shown in FIG. 11.

Figure 11A:
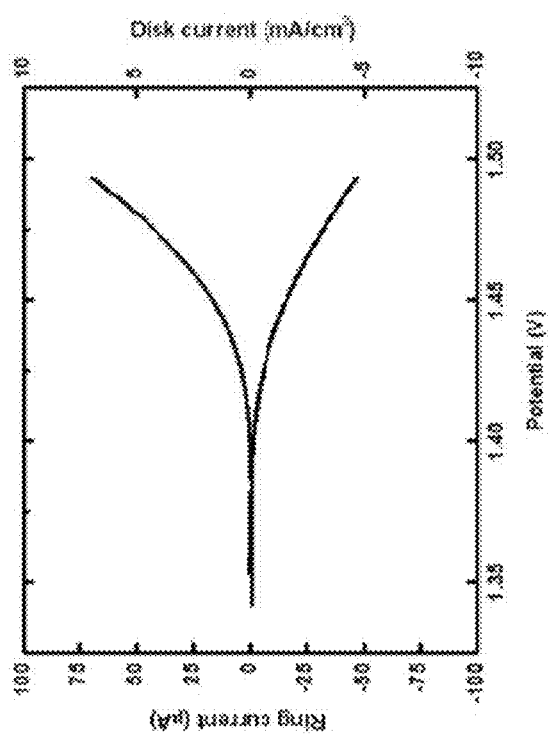
FIGS. 11(a) and 11(b) depict ruthenium metal dissolution during OER monitored by rotating ring disk in acid electrolytes with the disk (upper curve) currents corresponding to the OER on Ru disk electrode and ring currents (lower curve) for "collecting" dissolved Ru4+ on the ring electrode during the OER in 0.1 M $HClO_4$; sweep rate 5 mV/s; rotation rate, 1600 rpm, and a comparison of corrected and uncorrected OER polarization curves for Ru metal, respectively, with the uncorrected (solid curve) currents being a summation of OER current and dissolution current and the corrected (dashed curve) current corresponding to OER current only, after subtracting contribution from dissolution using the current obtained from collection on the ring electrode; sweep rate 5 mV/s, rotation 1600 rpm; (black curves) 0.1M KOH and (red curves) 0.1M $HClO_4$.
Figure 11B:
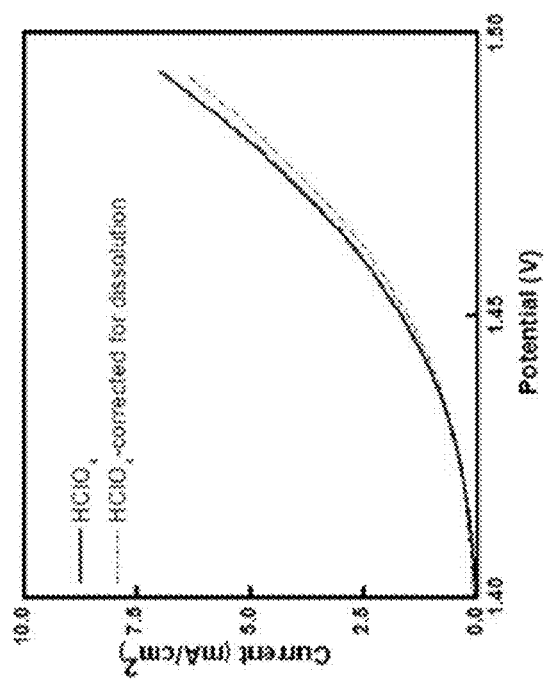

FIG. 11(a) shows that as the potential was scanned positively from 1.32 V, the OER evolution on the Ru disk was followed by negative currents for deposition of Ru4+ on the ring electrode, indicating that OER was accompanied by Ru dissolution. A Ru dissolution current contributed only 12% to the total current measured on the ring electrode; e.g. the efficiency of $O_2$ production is close to 90%. The uncorrected and corrected OER polarization curves are presented in FIG. 11(b). The corrected OER curve was obtained by subtracting the dissolution current, obtained from the RRDE measurement, from the OER current. The corrected OER current represents a true measure of the OER activity.

XPS (X-ray photoemission spectroscopy) measurements were performed in an Omicron UHV (ultra high vacuum) system having a base pressure of $10^{-11}$ Torr. Specimens were illuminated with monochromatized aluminum k-α radiation of 1.486 keV photon energy. The photoemitted electrons were directed into a hemispherical energy analyzer where their flux was measured as a function of their energy. The resulting spectrum was a signature of the atomic composition of the near-surface (about two nanometer deep) region of the specimen. Specimens were examined after cleaning in-situ in UHV or as prepared, without being cleaned. Cleaning in UHV consisted of multiple cycles of sputtering with 1 keV argon ions followed by heating to 850° C. After cleaning only ruthenium and/or iridium spectra were observable in XPS.

LEISS (low energy ion scattering spectroscopy) measurements were performed in an Omicron UHV (ultra high vacuum) system having a base pressure of $10^{-11}$ Torr. Specimen surfaces were irradiated with a beam of either helium ions or neon ions, and the energy of the scanning ions was 1.0 keV. Those backscattered ions that had a fixed geometrical relation to the irradiating beam were directed into a hemispherical energy analyzer where their flux was measured as a function of their energy. The resulting spectrum was a signature of the composition of the outermost single atomic layer of the specimen's surface. Specimens were examined after cleaning in situ in UHV. Cleaning in UHV consisted of multiple cycles of sputtering with 1 keV $Ar^+$ ions followed by heating to 850° C. Specimens were examined after a final sputtering step or after a final heating step in order to observe changes in the composition of the outermost atomic layer.

X-ray absorption spectroscopy (XAS) data was acquired at bending magnet beamline 12-BM-B at the Advanced Photon Source (APS), Argonne National Laboratory. The beamline uses a double crystal Si(111) monochromator to define the incident X-ray energy and a double mirror system for horizontal beam focusing and harmonic rejection. A custom made in-situ electrochemical X-ray cell with an Ag/AgCl reference electrode was mounted vertically to minimize elastic scattering intensity, and to better match the focused beam shape. XAS was taken in fluorescence mode with a 13 element Ge detector (Oxford). The energy was calibrated by using Ru and Ge foils. The electrode potential and solution volume above the sample were maintained to not interfere with the XAS measurements or the electrochemical surface. In order to summarize and compare the oxidation of the different samples an "effective oxide thickness," the oxide fraction normalized by the film thickness, was utilized.

Figure 8A:
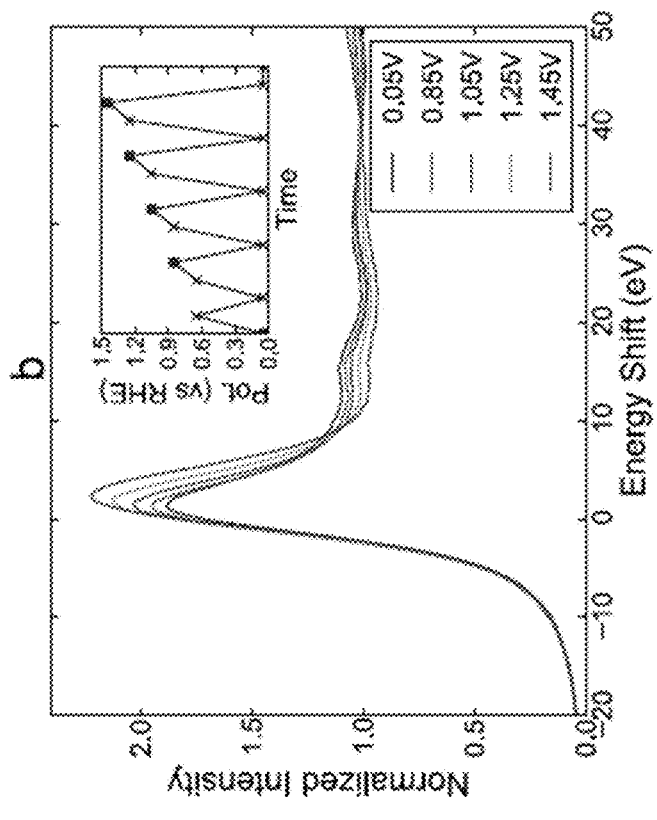
FIGS. 8(a) and 8(b) depict in-situ XANES of 5 nm Ru and 1 nm Ir films on a titanium substrate, respectively, and the inset of 8(b) shows the sequence of potential sweeps taken during the experiment with circles marking the plotted XANES.
Figure 8B:
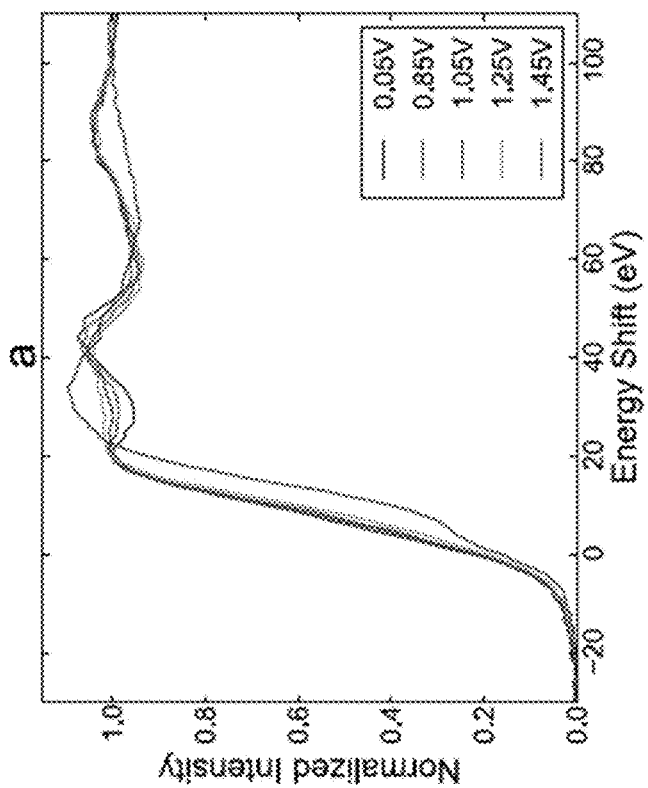

XAS was performed in-situ for sputtered metal films of different thickness, sputtered on titanium. The film thickness was calibrated with X-ray reflectivity measurements on a Si witness wafer during sputtering. The initial series of potential sweeps were performed with increasing maximum potential between 0.05 V to 1.45 V vs RHE in 0.1M $HClO_4$. FIG. 8(a) shows the Ru K and FIG. 8(b) shows the Ir L3 edge XANES spectra of pure Ru and Ir films, respectively. The changes in the XANES are indicate an increase in the oxidation state in the near surface region of the respective cation species and the formation of an oxide film with increasing potential.

After the initial potential sweeps to 1.45 V, potential cycling was used on the pure Ru and Ir films to completely oxidize the metal film. For Ru, the initial XANES at 1.45 V had the highest shift in the edge energy, a stable Ru XANES that reduced when the potential was lowered to 0.05 V. This indicates that most of the Ru undergoes oxidation at 1.45 V, subsequent potential cycling or excursions to higher potentials resulted in oxidation state >4+, but <<6+ or 8+ (which were never observed except for standards). Based on comparison with standards, 3+ and 4+ were assigned as the oxidation state of the stable and 1.45 V phases. The Ru4+ XANES may actually be a mix of different phases, with an oxidation state higher than 4+, as this is a transient phase.

Figures 9A, 9B:
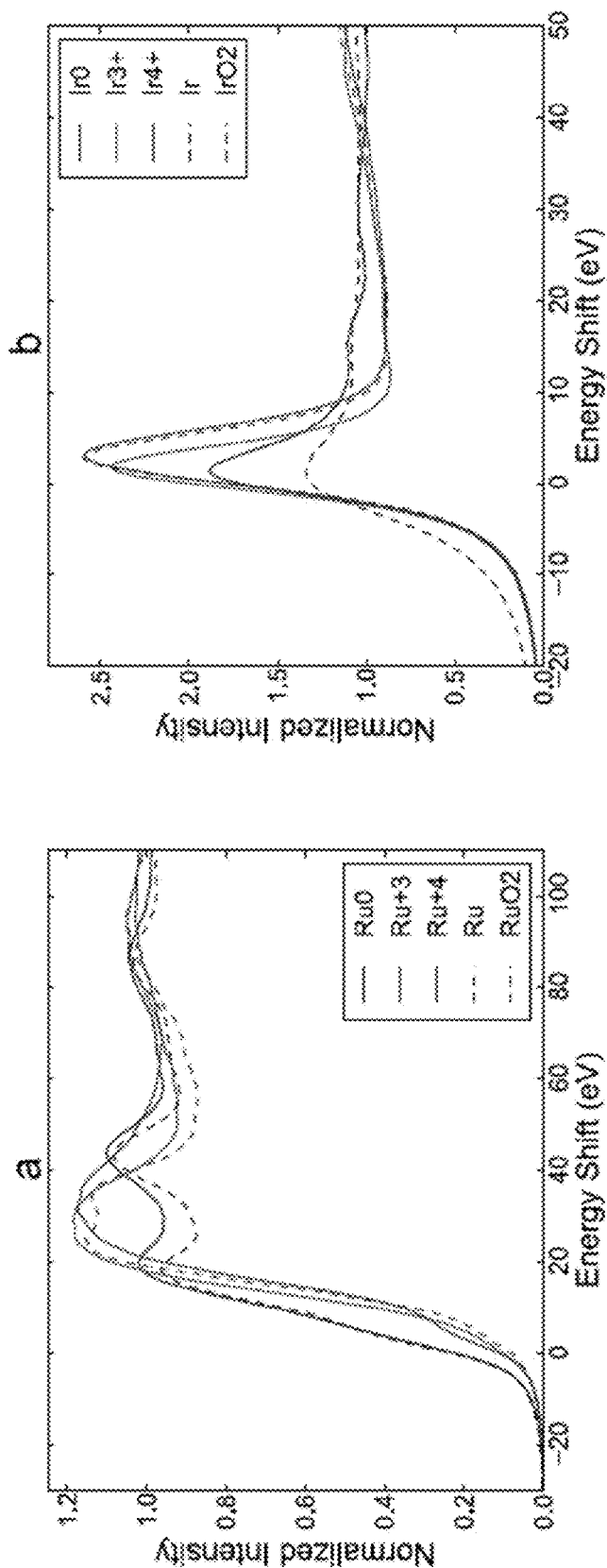
FIGS. 9(a) and 9(b) depict basis XANES spectra obtained for Ru and Ir thin films, respectively, and include comparative powder standards.

In the case of Ir, potential cycling to 1.45 V increased XANES peak intensity (called the 'white line') at 0.05 V. Continued potential cycling resulted in a stable Ir L3 XANES at 0.05 V, which does not change with potential cycling. This result indicates full oxidation of the Ir film. In contrast with Ru, the XANES changes with potential in the fully oxidized Ir film. Subsequent potential cycling or excursions to higher potentials resulted in an oxidation state >4+, but <<6+. By comparing FIG. 11 with standards, a 3+ and 4+ oxidation state was assigned to the fully oxidized Ir film at 0.05 V and 1.45 V, respectively. The XANES spectra of the metal and fully oxidized films are shown in FIGS. 9(a) and 9(b).

Figure 10A:
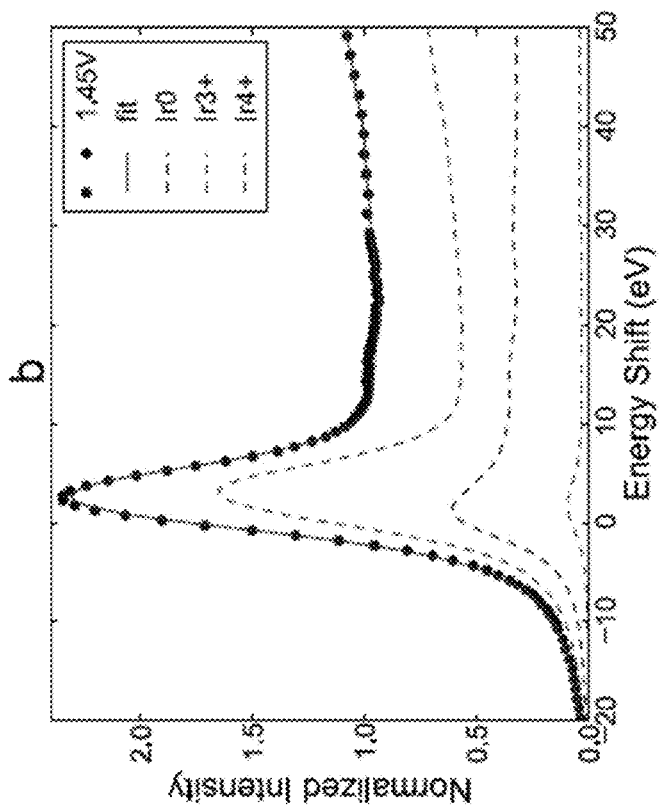
FIGS. 10(a) and 10(b) depict linear combination fits on sputtered $Ru_{0.50}Ir_{0.50}$ films at 1.45 V for Ru and Ir, respectively.
Figure 10B:
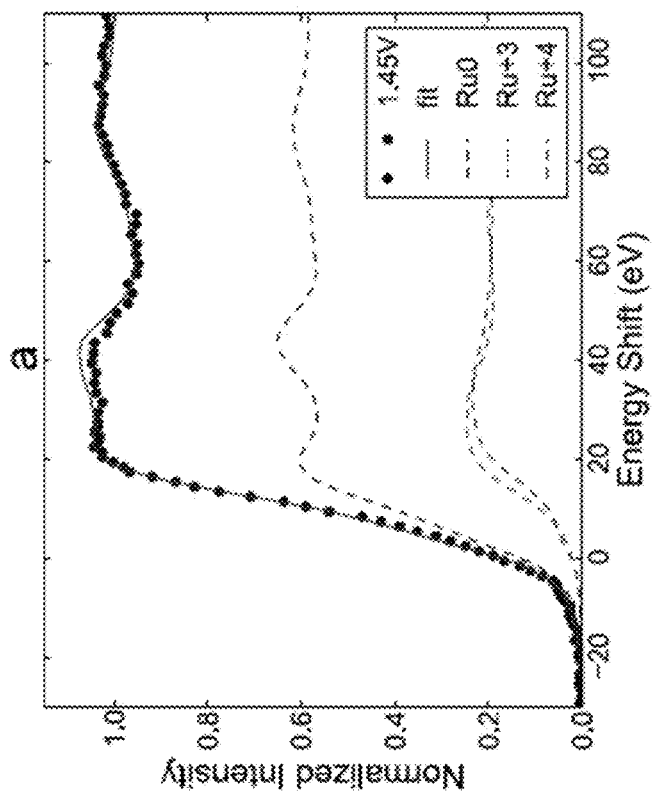

These XANES spectra were utilized as a basis for linear combination fits in order to extract quantitative amounts of oxides present in the film. An example of a linear combination fit is shown in FIG. 10, where the sum of the fraction of the 3 components present in the XANES spectra was fixed to be 1. The fractions of metal, +3 and +4 oxides, respectively (as fit to standards for metals and oxides of Ru and Ir), present in the samples may be extracted through this method. Using this method, the oxide layer thickness of each component fraction was then extracted, and then combined with the known deposited metal film thickness to obtain the "effective thickness" (normalized thickness) of the oxide. The effective thickness is summarized as a function of the applied potential at which the oxide formation occurs in FIG. 3.

Additional Notes

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:
1. A method comprising:
heating a bimetallic composition of the formula $Ru_{1-x}Ir_x$ wherein $0.1 \leq x \leq 0.75$ at a first temperature in a reducing environment; and
heating the composition at a second temperature in an oxidizing environment, wherein the resulting material exhibits a surface with an Ir concentration that is greater than an Ir concentration of the material as a whole.

2. The method of claim 1, wherein the reducing environment comprises $H_2$ in an amount of at least about 3% up to about 5%, with the remainder being an inert gas.

3. The method of claim 1, wherein the first temperature is at least about 300° C. up to about 500° C.

4. The method of claim 1, wherein the oxidizing environment comprises pure $O_2$.

5. The method of claim 1, further comprising forming the bimetallic composition by:
   forming a solution containing Ru and Ir;
   heating the solution to a first reaction temperature;
   adding a reducing agent to the solution;
   heating the solution to a second reaction temperature; and
   recovering nanoparticles of the bimetallic composition.

6. The method of claim 5, wherein the nanoparticles are recovered by a process comprising:
   cooling the solution; and
   adding ethanol to the cooled solution to precipitate the nanoparticles.

7. The method of claim 1, wherein the bimetallic composition is homogeneous prior to heating in the reducing environment.

8. The method of claim 1, wherein $0.4 \leq x \leq 0.6$.

9. The method of claim 1, wherein $x=0.5$.

10. The method of claim 1, wherein the Ir concentration of the surface is at least about 10% greater than the Ir concentration of the material as a whole.

11. The method of claim 1, wherein the surface of the resulting material is substantially free of Ru.

12. A material comprising:
    a bimetallic composition of the formula $Ru_{1-x}Ir_x$ wherein $0.1 \leq x \leq 0.75$,
    wherein a surface of the material has an Ir concentration that is greater than an Ir concentration of the material as a whole.

13. The material of claim 12, wherein the material is in the form of nanoparticles.

14. The material of claim 12, wherein the material is in the form of nanoparticles with a particle size distribution centered in the range of about 5 nm up to about 10 nm.

15. The material of claim 12, wherein $0.4 \leq x \leq 0.6$.

16. The material of claim 12, wherein $x=0.5$.

17. The material of claim 12, wherein the Ir concentration of the surface is at least about 10% greater than the Ir concentration of the material as a whole.

18. The material of claim 12, wherein the surface of the resulting material is substantially free of Ru.

19. An electrochemical apparatus comprising a bimetallic catalyst composition of the formula $Ru_{1-x}Ir_x$ wherein $0.1 \leq x \leq 0.75$,
    wherein a surface of the material has an Ir concentration that is greater than an Ir concentration of the material as a whole.

20. The electrochemical apparatus of claim 19, wherein the electrochemical apparatus is a polymer electrolyte membrane electrolyzer.

* * * * *